XX(12) United States Patent
Spaulding et al.

(10) Patent No.: US 6,754,384 B1
(45) Date of Patent: Jun. 22, 2004

(54) METHOD FOR PROCESSING AN EXTENDED COLOR GAMUT DIGITAL IMAGE USING AN IMAGE INFORMATION PARAMETER

(75) Inventors: Kevin E. Spaulding, Spencerport, NY (US); Geoffrey J. Woolfe, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 681 days.

(21) Appl. No.: 09/651,510

(22) Filed: Aug. 30, 2000

(51) Int. Cl.[7] .............................................. G06K 9/00
(52) U.S. Cl. ......................... 382/167; 345/590; 358/519
(58) Field of Search ................................ 382/162–169, 382/240, 275, 284, 117; 345/581, 589–591; 347/129; 399/39; 358/1.9, 2.1, 3.01, 3.24, 3.26, 3.27, 504, 515–523; 348/222.1, 223.1, 225.1; 386/31, 32, 37, 38

(56) References Cited

U.S. PATENT DOCUMENTS

| 4,417,270 | A | | 11/1983 | Nagao et al. |
| 5,268,754 | A | | 12/1993 | Van de Capelle et al. |
| 5,289,548 | A | * | 2/1994 | Wilson et al. .............. 382/250 |
| 5,317,425 | A | | 5/1994 | Spence et al. |
| 5,333,069 | A | | 7/1994 | Spence |
| 5,454,050 | A | * | 9/1995 | Nakabayashi et al. ...... 382/165 |
| 5,510,910 | A | | 4/1996 | Bockman et al. |
| 5,577,176 | A | * | 11/1996 | Friedman et al. ........... 345/427 |
| 5,600,764 | A | * | 2/1997 | Kakutani .................... 345/591 |
| 5,666,215 | A | | 9/1997 | Fredlund et al. |
| 5,713,062 | A | | 1/1998 | Goodman et al. |
| 5,760,386 | A | | 6/1998 | Ward |
| 5,949,967 | A | | 9/1999 | Spaulding et al. |
| 5,990,931 | A | | 11/1999 | Nimri et al. |
| 5,991,511 | A | * | 11/1999 | Granger ...................... 358/1.9 |
| 6,105,007 | A | * | 8/2000 | Norris ......................... 705/38 |
| 6,198,843 | B1 | * | 3/2001 | Nakauchi et al. ........... 382/167 |
| 6,351,557 | B1 | * | 2/2002 | Gonsalves .................. 382/167 |
| 6,389,169 | B1 | * | 5/2002 | Stark et al. ................. 382/225 |
| 6,430,311 | B1 | * | 8/2002 | Kumada ..................... 382/162 |
| 6,591,009 | B1 | * | 7/2003 | Usami et al. ............... 382/165 |

OTHER PUBLICATIONS

"Digital Image Processing" by Rafael C. Gonzalez and Richard E. Woods, published by Addison–Wesley Publishing Co., 1992, Section 6.3.

* cited by examiner

*Primary Examiner*—Bhavesh M. Mehta
*Assistant Examiner*—Yubin Hung
(74) *Attorney, Agent, or Firm*—Raymond L. Owens

(57) ABSTRACT

A method for determining information parameter(s) useful in processing a digital image having color values with an extended color gamut, includes the steps of: adjusting the color values of the extended color gamut digital image to fit within a limited color gamut to form a limited color gamut digital image; determining a residual image representing a difference between the extended color gamut digital image and the limited color gamut digital image; and analyzing the residual image to determine one or more image information parameter(s) related to the information contained in the residual image such parameter(s) being useful in processing the digital image.

32 Claims, 6 Drawing Sheets

METHOD FOR PROCESSING AN EXTENDED COLOR GAMUT DIGITAL IMAGE USING AN IMAGE INFORMATION PARAMETER

CROSS REFERENCE TO RELATED APPLICATIONS

Reference is made to commonly assigned U.S. Ser. No. 09/162,205, filed Sep. 28, 1998, U.S. Ser. No. 09/162,026, filed Sep. 28, 1998, U.S. Ser. No. 09/162,134, filed Sep. 28, 1998, U.S. Ser. No. 09/162,201, filed Sep. 28, 1998, U.S. Ser. No. 09/354,808, filed Jul. 16, 1999, U.S. Ser. No. 09/489,367, filed Jan. 21, 2000, U.S. Ser. No. 09/543,652, filed Apr. 5, 2000 and U.S. Ser. No. 09/543,038, filed Apr. 5, 2000, the disclosures of which are incorporated herein by reference.

FIELD OF THE INVENTION

The present invention relates to the field of digital imaging, and more particularly to representing an extended color gamut digital image.

BACKGROUND OF THE INVENTION

In digital imaging systems, there are many ways to represent images in digital form. Not only are there many different formats of digital files, but there is also a large variety of different color spaces and color encodings that can be used to specify the color of digital images.

In some cases, the color encoding may be in terms of a so-called device independent color space, such as the well-known CIELAB color space. In recent years, this color space has been used extensively to specify the color of digital images in color-managed digital imaging systems. In some cases, the image may actually be stored in the CIELAB color space. More commonly, the color space may be used to connect device profiles, which can be used to describe the color characteristics of various color imaging devices such as scanners, printers, and CRT video displays. The KODAK PhotoYCC Color Interchange Space is another example of a device independent color space that can be used to encode digital images.

In other cases, the color-encoding may be in terms of a device dependent color space. Video RGB color spaces and CMYK color spaces are examples of this type. When a color image is encoded in a device dependent color space, it will have the desired color appearance when it is displayed on the particular output device associated with that color space. The advantage of a device dependent color space is that the image is ready to be displayed or printed on the target device. However, the disadvantage is that the image will necessarily be limited to the color gamut of the target device. The color gamut of an imaging device refers to the range of colors and luminance values that can be produced by the device. Therefore, if the target device has a limited dynamic range, or is incapable of reproducing certain saturated colors, then it is not possible to encode color values outside of the range of colors that can be produced on the device.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation because the color values can not be properly interpreted unless the characteristics of the target video display are known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. One such proposed standard color space is known as "sRGB." (See "Multimedia Systems and Equipment-Colour Measurement and Management-Part 2-1: Colour Management-Default RGB Colour Space-sRGB, "IEC"61966-2-1) This color space specifies a particular set of red, green, and blue primaries, a particular white-point, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that this color space has a limited color gamut relative to other output devices. Additionally, any output device will have a limited color gamut relative to that of an original scene. For example, a scene may have a luminance dynamic range of 1000:1 or more, whereas a typical video display or reflection print will have a dynamic range on the order of 100:1. Certain image capture devices, such as photographic negative film, can record dynamic ranges as large as 8000:1. Even though this is larger than the luminance dynamic range associated with most scenes, the extra dynamic range is often useful to provide allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges may be quite similar.

For example, FIG. 1 shows a comparison of a typical Video RGB Color Gamut 10 and a typical Reflection Print Color Gamut 12. In this case, a*-b* cross-sections of the color gamuts are shown in the CIELAB space at an L* of 65. The colors that are inside the boundary are within the gamuts of the respective devices, while those that are outside the boundary cannot be reproduced, and are therefore referred to as "out-of-gamut" colors. It can be seen that there is a large set of color values with a b* value larger than 60 that can be produced on the printer, but are outside the color gamut of the video display. As a result, if the reflection print were scanned and stored in a video RGB color space, it would not be possible to encode this color information.

The mismatch between the video RGB color gamut and the color gamuts of other output devices and image sources represents a serious limitation on the usefulness of the video RGB color space. However, in many cases, the convenience of storing the image in a color space that is ready for direct display on a computer video CRT has been the over-riding factor in the determination of the preferred color space. This has come at the expense of applications that can utilize the extended color gamut information that may have existed in an input image. This extended color gamut information can be useful for many different types of image processing operations.

SUMMARY OF THE INVENTION

It is an object of the present invention to overcome the limitations of the prior art by using a residual image to store the information that is lost during the process of forming a limited color gamut digital image from an extended color gamut digital image. The residual image can then be analyzed to provide image information parameters that can be used in the process of applying one or more image processing operations to the digital image.

These objects are achieved by a method for determining information parameter(s) useful in processing a digital image having color values with an extended color gamut, comprising the steps of:

a) adjusting the color values of the extended color gamut digital image to fit within a limited color gamut to form a limited color gamut digital image;

b) determining a residual image representing a difference between the extended color gamut digital image and the limited color gamut digital image; and c) analyzing the residual image to determine one or more image information parameter(s) related to the information contained in the residual image such parameter(s) being useful in processing the digital image.

In another aspect of the present invention, the image information parameter(s) are used in the process of applying one or more image processing operations to the extended color gamut digital image or a derived digital image formed from the extended color gamut digital image to form a modified digital image.

ADVANTAGES

The present invention has an advantage in that a digital image can be stored in a color space convenient for a particular application while overcoming the color gamut limitation associated with that color space. Associated image information parameter(s) can then be used to select or modify image processing operations to be applied to the digital image.

The present invention has an additional advantage that it can be used to determine what image processing operations should be interactively presented to a user.

DETAILED DESCRIPTION OF THE INVENTION

Figure 2:
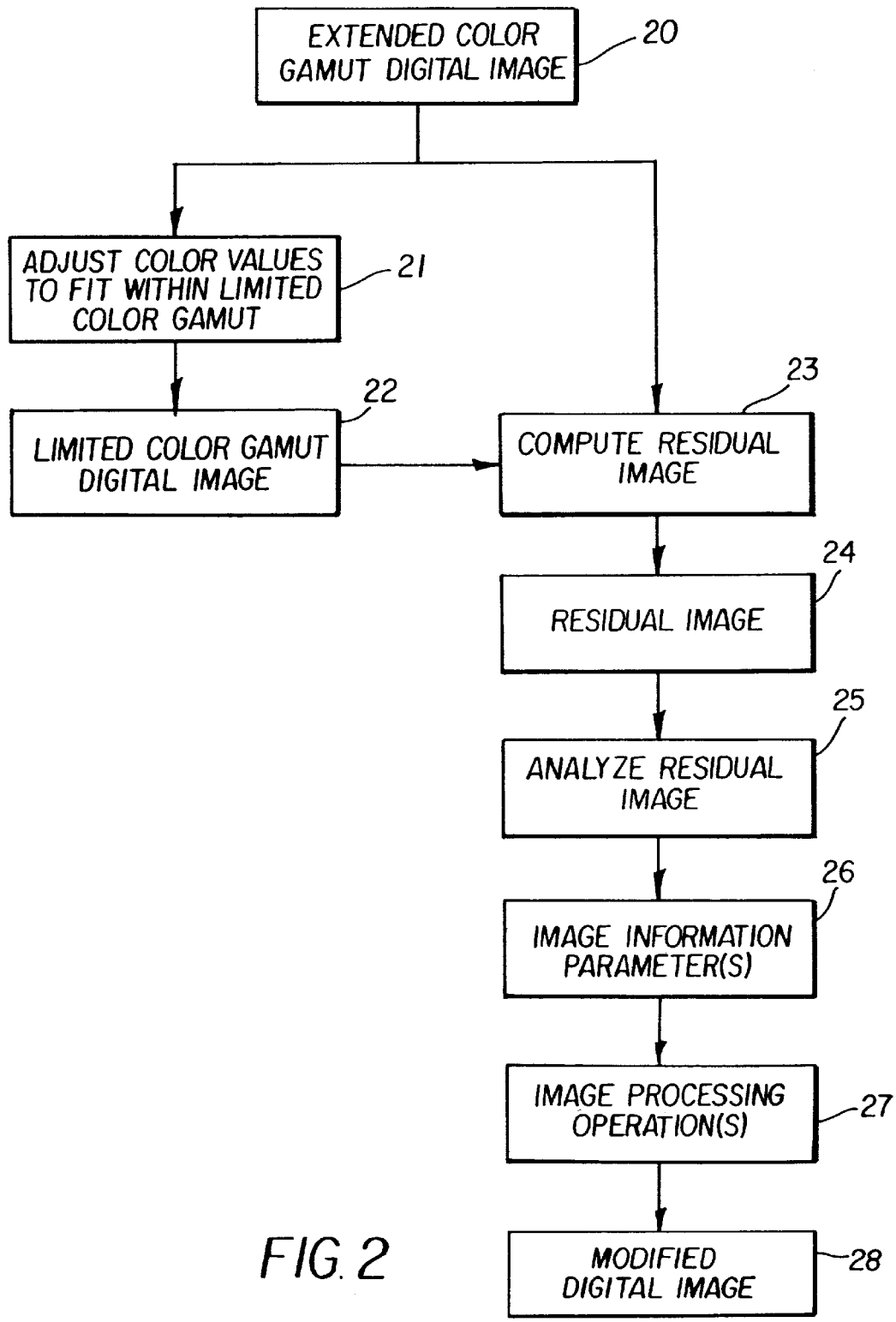
FIG. 2 is a flowchart showing the basic steps of the present invention.

A flowchart showing one embodiment of the present invention is given in FIG. 2. An extended color gamut digital image 20 has color values that are outside the limited color gamut of a storage color space. An adjust color values step 21 is used to limit the color values to those that will fit within the limited color gamut of the storage color space to form a limited color gamut digital image 22. A compute residual image step 23 is used to determine a residual image 24 representing the difference between the extended color gamut digital image and the limited color gamut digital image. An analyze residual image step 25 is then used to determine one or more image information parameter(s) 26 by analyzing the residual image 24. The image information parameter(s) 26 are then used in the process of applying one or more image processing operation(s) 27. The image processing operation(s) 27 can be applied to the extended color gamut digital image or a derived digital image formed from the extended color gamut digital image, to form a modified digital image 28.

Each of the aspects of the invention shown in FIG. 2 will now be discussed in more detail. The extended color gamut digital image 20 can take many different forms. For example, the image can be a scanned photographic print, a scanned photographic negative, a scanned photographic transparency, an image from a digital camera, or an image from another source such as a computer-generated digital image. Depending on the source of the image, as well as any image processing that has been applied to the image, the image may have very different color gamuts and color representations. Images from scanned photographic negatives and digital cameras can contain scene information having a much larger luminance dynamic range than can be encoded in many storage color spaces. In this case, luminance dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as a three-dimensional volume. Color values that are within the volume are said to be "in-gamut," whereas colors that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The extended color gamut digital image will generally have a larger luminance dynamic range and a larger range of chroma values than the limited color gamut digital image. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta and yellow).

If the image were a scanned photographic print, the color gamut of the image would generally be the color gamut of the original photographic print medium. Likewise, if the image were captured by a digital camera, the color gamut of the image would generally be that of an original scene, although it may be limited by the dynamic range of the camera sensor and by lens flare. The color space that the image is represented in is somewhat independent of the color gamut of the original image. For example, the color values for a scanned photographic print can be represented as raw scanner code values, or they can be given by device independent color values according to a color space such as the CIELAB color space. Alternatively, the color values can be expressed in some other color space.

Figure 1:
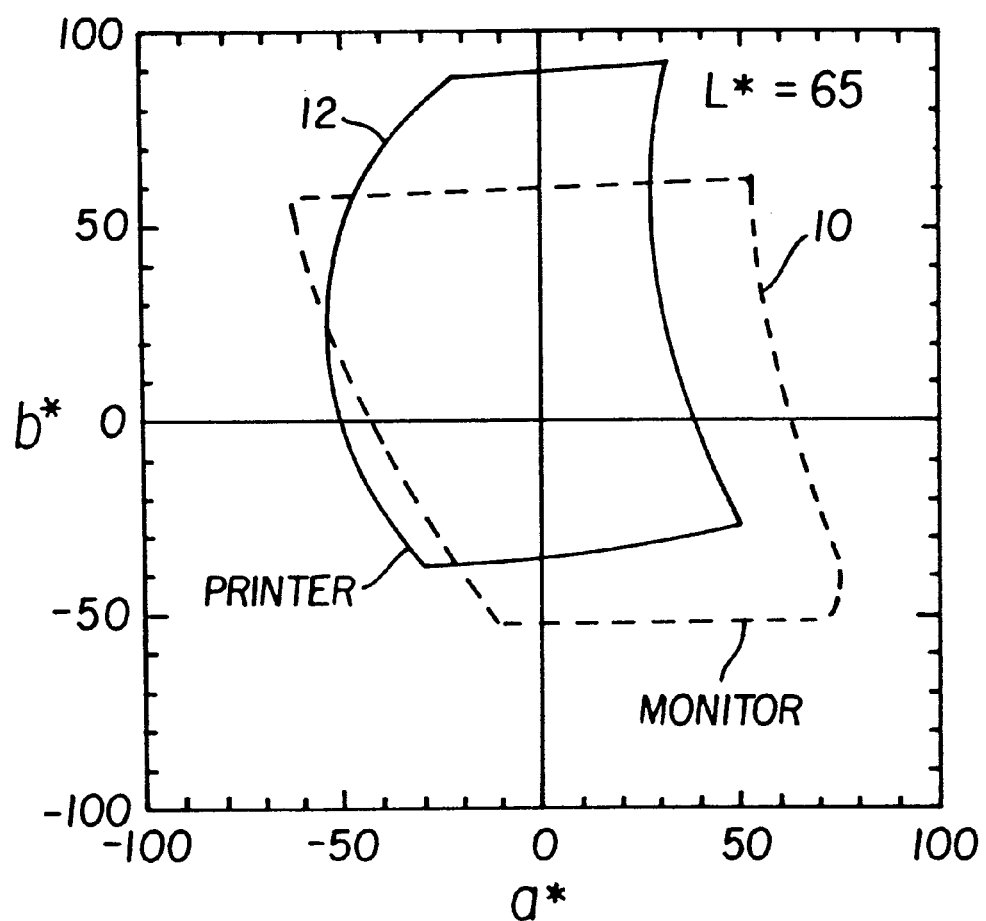
FIG. 1 is graph comparing the color gamuts of a typical video display, and a typical reflection print.

For many applications, it is convenient to store, display and manipulate the digital image in a particular storage color space that is well suited for the work flow associated with that application. Frequently, the storage color space that is chosen will be a device dependent color space associated with a common output device or medium used by the system. In many cases, video RGB color spaces are used because they can be displayed or previewed directly on a computer video display without any further processing. Additionally, many software applications that are available to manipulate images on a computer are designed to work with images in a video RGB color space. The color gamut of the storage color space will often be smaller than, or at least different from, the color gamut of the extended color gamut digital image 20. As a result, there generally will be colors in the extended color gamut digital image 20 that can not be represented in the limited color gamut storage color space. For example, consider the case where the extended color gamut digital image 20 is a scanned photographic print. There are many colors within the color gamut of the reflection print that are outside the color gamut of the video RGB color space. This can clearly be seen in FIG. 1, which shows cross-sections through a typical Video RGB Color Gamut 10, and a typical Reflection Print Color Gamut 12.

Therefore, information must be discarded in order to store the reflection print color values in a video RGB color space, or any other limited color gamut storage space. In prior art methods, the information that is discarded is lost permanently and can not be recovered. In the present invention, the information that is lost will be stored in a residual image.

The adjust color values step 21 is used to adjust the color values of the extended color gamut digital image to fit within the limited color gamut of the storage space, forming a limited color gamut digital image 22. In this step, information must be discarded when color values that are outside the limited color gamut are mapped to color values within the limited color gamut. In some cases, the color values for the out-of-gamut colors are simply "clipped," i.e., they are mapped to color values the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut may also have a larger luminance dynamic range than can be represented in the limited color gamut. In the case where it is necessary to reduce the luminance dynamic range of the image, one part in the implementation of the adjust color values step 21 is typically the application of a tone scale function. The tone scale function might be applied to a luminance channel of the image, or alternatively to each color channel of an RGB color representation. In some applications, the image being processed may actually be a monochrome image, e.g., a black-and-white image. In this case, the tonescale function would be applied to the image luminance values.

For cases where the extended color gamut digital image is a representation of the colors in an original scene, the adjust color values step 21 will typically involve determining reproduced color values that will produce desired aim colors on a target output device. For example, optimal color reproduction aims can be applied to determine desired video RGB aim colors for the original scene colors. The process of transforming the original scene color values into aim reproduced color values is sometimes referred to as "rendering" the image.

A compute residual image step 23 is used to determine a residual image 24 representing the difference between the extended color gamut digital image 20 and the limited color gamut digital image 22. In its simplest form, the residual image can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image 24. For example, it might be desirable to compute the residual image in a color space that is well-suited for compressing the residual image or that is convenient for use in reconstructing the extended color gamut digital image. Generally, the extended color gamut digital image 20 and the limited color gamut digital image 22 should be represented in the same color space before the residual image 24 is calculated so that the in-gamut colors will be given by zero residual errors. Since most images will only have a small fraction of color values that are out of gamut, the residual image will be dominated by zeros, and therefore will be highly compressible.

For cases where the adjust color values step 21 involves the application of a transform that modifies the color values for the colors within the limited color gamut as well as those outside the limited color gamut, a residual image determined by directly computing the difference between the input color values of the extended color gamut digital image and the adjusted color values of the limited color gamut digital image 22 would have a large number of non-zero values. This could be undesirable for cases where the residual image is to be compressed. The prior example where the extended color gamut digital image is a representation of the original scene, and the adjust color values step 21 includes rendering the color values to determine desirable color values for a target output device, will generally suffer from this problem. In this case, it can be desirable to apply a second rendering function to the extended color gamut digital image to determine a second set of rendered color values that are desirable for another output device having a larger color gamut than the first target output device. If the second rendering function were identical to the first rendering function throughout most of the color gamut, then a residual image computed by taking the difference between the first and second rendered images would again be largely dominated by zero differences. In one preferred embodiment of the present invention, the first rendering function produces a rendered image that is optimized for a video display, and the second rendering function produces a rendered image that is optimized for some hypothetical output device having an idealized large color gamut.

After the residual image 24 has been calculated, an analyze residual image step 25 is used to analyze the residual image 24 to determine one or more image information parameter(s) 26. The image information parameter(s) 26 are used to quantify some aspect of the residual image that can be useful for influencing some aspect of one or more image processing operation(s) that can be applied to the digital image. For example, a simple image information parameter 26 that can be computed would be the fraction of the image pixels where the residual image 24 had non-zero values which would be an indication of the relative amount of the image that is outside of the limited color gamut. Alternatively, a similar image information parameter 26 would be the fraction of the image pixels where the absolute value of the residual image values exceeds some threshold value. This would provide a measure of the relative fraction of the image that is significantly outside of the limited color gamut. Both of these image information parameter variations can be computed by comparing pixel values of the residual image to a threshold value on a pixel-by-pixel basis, and counting the number of pixels exceeding the threshold. Variations on this basic theme would include determining a parameter relating to the amount, extent or distribution of the extended dynamic range information contained in the residual image, or the amount, extent or distribution of extended color gamut information contained in the residual image.

There are many other types of image information parameters that can also be determined. For example, statistical metrics could be computed from the residual image. These statistical metrics would include the average magnitude of the residual image values, the variance of the residual image values, or higher order moments of the residual image values. These metrics would relate to how much information the residual image contains, as well as the nature of that information. For example, a residual image with a larger average magnitude will generally contain more information than one with a smaller average magnitude.

Another class of image information parameters that can be computed include those based on the statistical information theory. Such image information parameters would include information content metrics such the well-known statistical entropy metric. (For more information on information theory concepts, please refer to Section 6.3 of "Digital Image Processing" by Rafael C. Gonzalez and Richard E. Woods, published by Addison-Wesley Publishing Co., 1992.) The image information parameters presented here are only examples of the types of parameters that can be used with the method of the present invention. It will be obvious to one skilled in the art that there are many other types of image information parameters that could be used to represent the amount and characteristics of the information contained in the residual image.

There are many ways that the image information parameter(s) 26 can be used in the process of applying image processing operation(s). For example, there may be certain types of image processing operations that are appropriate for images with particular types of image content. Consider an image having an extended dynamic range, such as a back-lit image having a foreground region in the deep shadows, together with a brightly lit background region. Image processing operations could be used to manipulate these images in such a way as to darken the brightly lit background region. For example, see co-pending, commonly assigned U.S. application Ser. No. 09/578,463, filed May 25, 2000 to Gindele et al., the disclosure of which is incorporated herein by reference. Such image processing operations can be referred to as "scene-dependent tonescale operations" and may be automatic, or may require manual user interaction. In the case of an automatic image processing operation, an image information parameter that is related to the amount, extent or distribution of extended dynamic range information in the image can be used to determine whether or not the image processing operation should be applied to the image. In the case of an image processing operation requiring manual user interaction, the image information parameter(s) can be used to determine whether or not to interactively present a choice to the user suggesting that the particular image processing operation should be applied to the image. For example, when the user accesses a high dynamic range image using an image processing workstation, the software can examine the image information parameter(s) and then display a message on the screen indicating that this particular image might benefit from the application of a scene-dependent tonescale operation and asking the user whether they would like to perform this operation.

In addition to affecting whether or not an image processing operation is applied to an image, the image information parameter(s) can also be used to adjust one or more control parameters for an image processing operation. For example, a scene-dependent tonescale operation may make use of a contrast control value. The contrast control value can be set to higher or lower levels in response to an image information parameter relating to the amount, extent or distribution of extended dynamic range information in the residual image. Similarly, a color enhancement operation may have a control value used to modify the amount of overall color boost applied to an image. This control value can be adjusted in response to an image information parameter relating to the amount, extent or distribution of extended color gamut information in the residual image.

Figure 3:
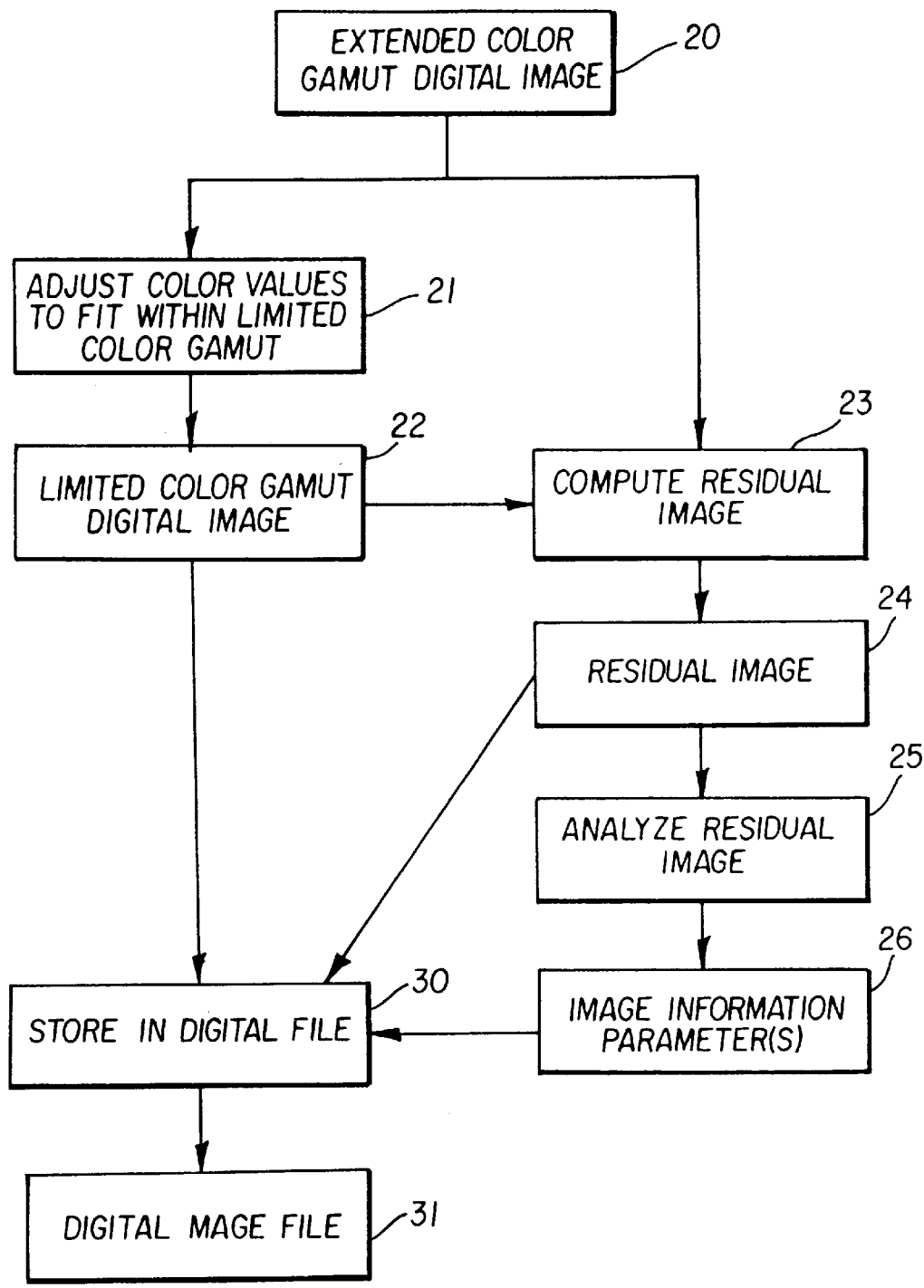
FIG. 3 is a flowchart showing the creation of a digital file in accordance with the present invention.

Once the residual image 24 has been calculated, it can be associated in some fashion with the limited color gamut digital image 22, such that the limited color gamut digital image 22 and the residual image 24 are adapted to be used to form a reconstructed extended color gamut digital image. This can involve storing the residual image 24 in a memory buffer that is associated with a second memory buffer used to store the limited color gamut digital image 22. Alternatively, many applications will store the image data in a digital file on some sort of digital storage media such as a magnetic disk, an optical disk, or a PCMCIA card. This configuration is shown in FIG. 3. Where elements of this figure are the same as those in FIG. 2, identical numbers have been used. In this case, the limited color gamut digital image 22, the residual image 24 and the image information parameter(s) are stored in a digital image file 31 using a store in digital file step 30. In many cases, the file format used to store the storage space digital image 24 may support the use of private tags to store additional data. For example, the file formats TIFF, EXIF and FlashPIX all support tags of this sort. These tags are sometimes referred to as "meta-data." In cases where file formats of this type are used, the residual image data and the image information parameter(s) can be stored in the form of meta-data tags in the image file. In this way, applications that do not know how to make use of the meta-data tags will simply ignore them, and will therefore have access only to the limited color gamut digital image 22. Whereas applications that know how to use the meta-data tags will be able to make use of them to reconstruct the extended color gamut digital image and use the image information parameter(s) accordingly in the process of applying image processing operations. In an alternate implementation of the present invention, the residual image and/or the image information parameter(s) could be stored in one or more additional digital files that can be associated with a digital file used to store the limited color gamut image.

Figure 4:
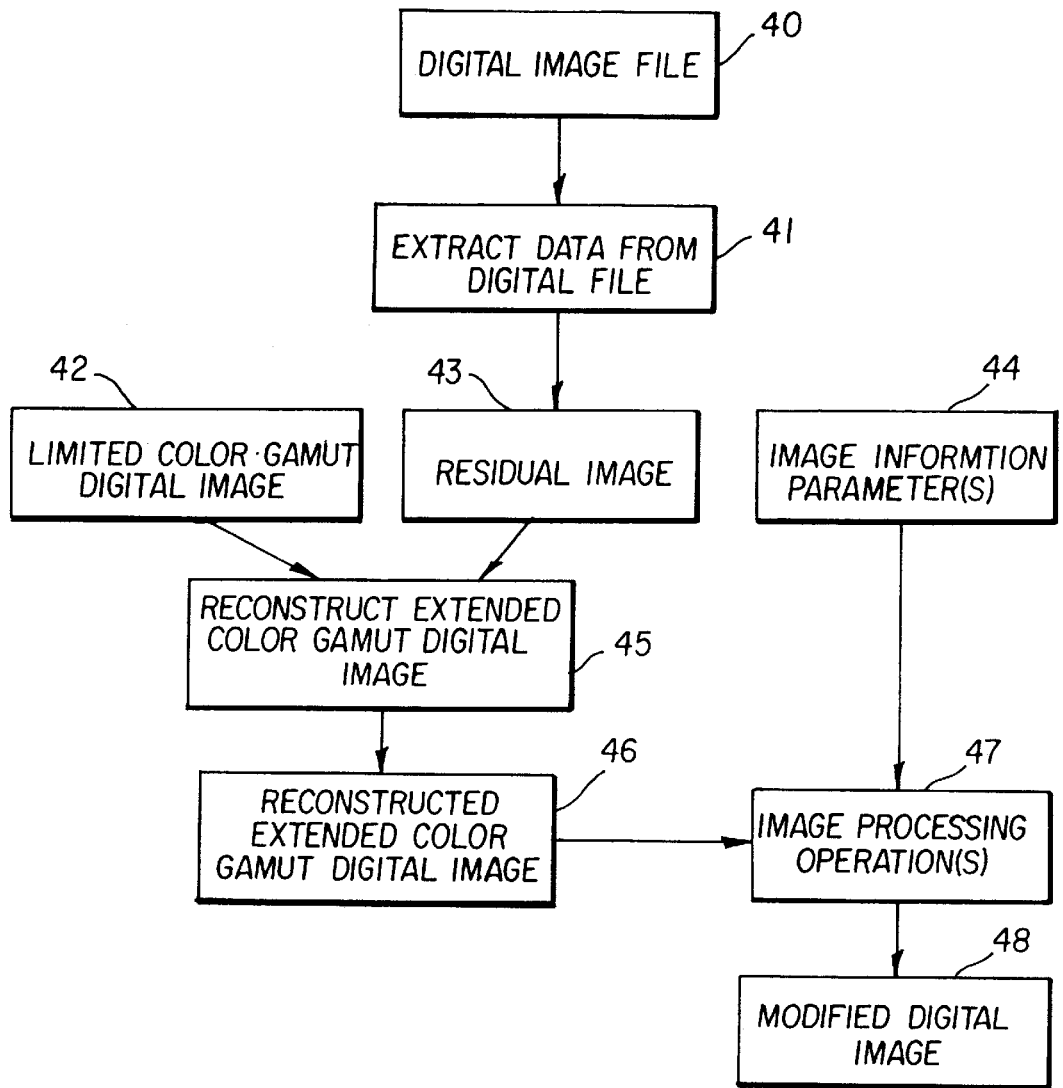
FIG. 4 is a flowchart showing the formation of a modified digital image in accordance with the present invention.

FIG. 4 shows an example of reconstructing an extended color gamut digital image from the limited color gamut digital image and the residual image, and subsequently using the image information parameter(s) in the process of applying one or more image processing operations. The input to this process is a digital image file 40 formed using the method of FIG. 3. An extract data from digital file step 41 is used to extract the limited color gamut digital image 42, the residual image 43 and the image information parameter(s) 44. A reconstruct extended color gamut digital image step 45 is then used to form a reconstructed extended color gamut digital image 46 by combining the limited color gamut digital image 42 and the residual image 43. Typically, this will be done by reversing the steps used to form the limited color gamut digital image and the residual image. The limited color gamut digital image 42 and the reconstructued extended color gamut digital image 46 are examples of derived digital images formed from the original extended color gamut digital image 20.

Next the image information parameter(s) are used in the process of applying one or more image processing operation(s) 47 that are applied to the reconstructed extended color gamut digital image 46 to form a modified digital image 48. In a variation of this method, the image information parameter(s) can be used in the process of applying image processing operations that are applied directly to the limited color gamut digital image 42 rather than the reconstructed extended color gamut digital image 46.

The modified digital image 48 can be used for many different purposes. For example, the modified digital image 48 can be printed using a digital printer, such as an ink jet printer, a thermal dye sublimation printer, or a printer using photographic paper. In other cases, it will be desirable to store the modified digital image 48 for subsequent use, such as by writing the modified digital image 48 back out to a new digital file. In this case, a new limited color gamut digital image and a new residual image can be calculated to encode the modified image, using the methods described by this invention. The modified digital image file can then be stored on a digital storage medium for access at a later time.

When the method of the present invention is practiced in a commercial imaging system, it will typically be desirable to obtain payment from a user in return for the service performed. The payment can be obtained at a number of different steps in the process. For example, payment can be obtained at the time that the customer provides input images to be processed. Alternatively, payment can be obtained when digital image files are provided to the user, at the time when image processing operations are performed on the digital images, or at any other stage in the process. In some cases, it may be desirable to obtain payment at multiple steps. For example, payment could be obtained when digital image files are provided to the user, and additional payment can be obtained when the user requests that additional image processing operations be applied to a selected digital image. Payment can be obtained from the user using many different methods. For example, payment can be obtained using a cash transaction, or by obtaining a payment identifier from user. The payment identifier can include information about an account from which payment is to be electronically transferred. Alternatively, the payment identifier can include a credit card account where the payment is to be debited. Other forms of payment identifiers are also possible including a check, etc. In one embodiment of the present invention, the payment identifier is obtained from the user via a digital communications network such as the Internet.

Figure 5:
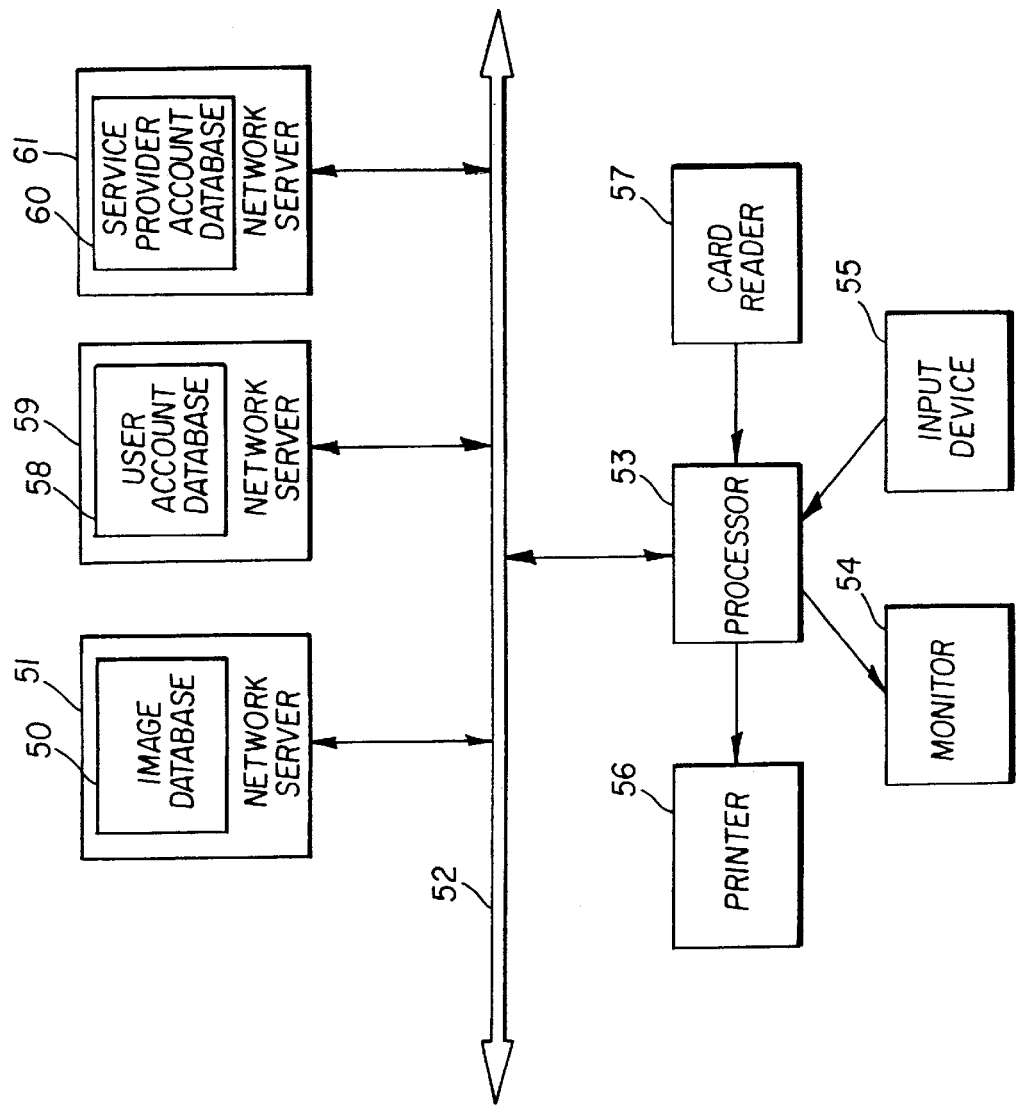
FIG. 5 illustrates a communications network configuration for practicing the current invention.

FIG. 5 illustrates an embodiment of the present invention where the digital image files are accessed by a digital communications network, such as the Internet. In this case, an image database 50 is located on a network server 51. The image database 50 is used to store digital image files that have been processed using the methods described earlier and will contain limited color gamut digital images, together with associated residual images and image information parameters. The network server 51 is connected to a communications network 52. For example, the communications network 52 could be the Internet, or a local area network. A user uses a processor 53 to access the network server 51 via the communications network 52. The processor 53 can be a home computer, or alternatively it could be a computer in a retail kiosk, etc. Typically, the processor would use a monitor 54 for the purpose of displaying preview images, and providing information to the user. One or more input devices 55 can be used by the user to provide instructions to the processor 53. Examples of typical input devices would include a keyboard, a mouse, a trackball, a touch pad or a touch screen. A printer 56 may also be connected to the processor for providing output prints to the user. Alternatively, a remote printer could also be accessed over the communications network 52 A card reader 57 can also be connected to the processor 53 for purposes of reading account information from a credit card or a debit card as part of the process of obtaining payment a user.

Other network servers can also be attached to the communications network 52. For example, consider the case where a user makes payment via a communications network. One common way for the user to provide a payment identifier to a service provider would be for him or her to supply a valid credit card number. The service provider would then access a user account database 58 on a network server 59 to debit the appropriate payment, which would then be credited to an account specified by the service provider by accessing a service provider account database 60 on another network server 61. After the payment has been transferred, the service provider would then provide the requested service to the user.

The method of the present invention can be generalized to be used with other types of residual images as well. For example, co-pending, commonly assigned U.S. application Ser. No. 09/354,808, filed Jul. 16, 1999 to Parada et al., the disclosure of which is incorporated herein by reference, describes a method for determining residual images representing the difference between a reference digital image and an image in a different image processing state formed using at least one digital image processing operation.

Figure 6:
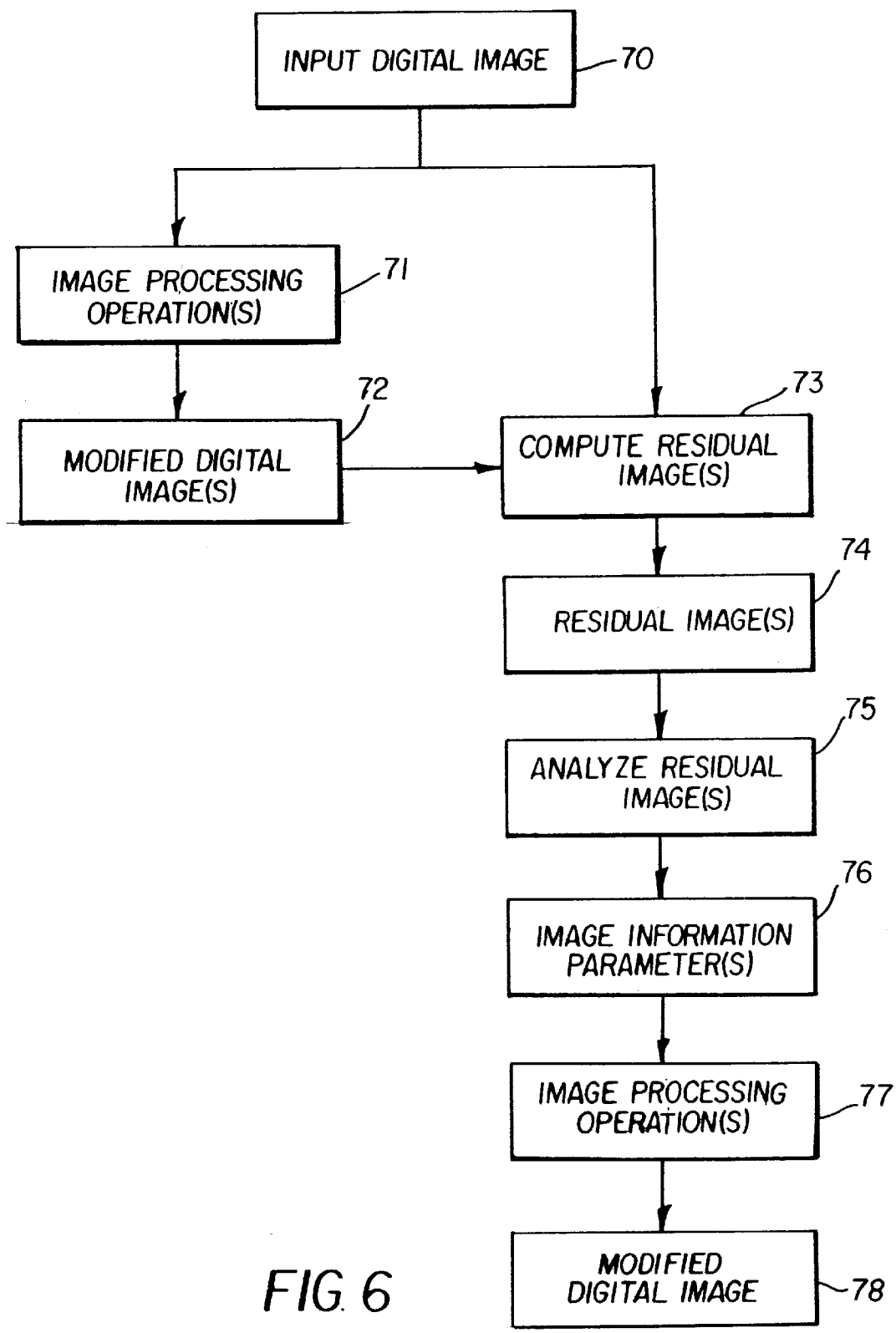
FIG. 6 is a flowchart showing another embodiment of the present invention using a generalized residual image.

A flowchart showing an embodiment of the present invention using a generalized residual image is shown in FIG. 6. An input digital image 70 is processed using one or more image processing operation(s) 71 to form one or more modified digital image(s) 72 corresponding to images in different imaging states. The image processing operation(s) 71 can include any type of image processing operation such as sharpening operations, color enhancement operations, noise removal operations, artifact removal operations, etc. One of the digital images (either the input digital image, or one of the modified digital images) is then designated as a reference digital image, and a compute residual image(s) step 73 is used to determine one or more residual image(s) 74 representing the difference between the reference digital image and another of the digital images. An analyze residual image(s) step 75 is then used to determine one or more image information parameter(s) 76 by analyzing the residual image(s) 74. The image information parameter(s) can relate to any type of information about the residual image, including measures of the amount and characteristics of the information contained in the residual image(s) 74. The image information parameter(s) 76 are then used in the process of applying one or more additional image processing operation(s) 77 to the input digital image 70 or a derived digital image formed from the input digital image 70 to form a modified image 78.

A computer program product having a computer readable storage medium can have a computer program stored thereon for performing all the steps of the present invention. The computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

This invention has been described in detail with particular reference to certain preferred embodiments thereof, but it will be understood that variations and modifications can be effected within the spirit and scope of the invention.

Parts List

10 Video RGB Color Gamut
12 Reflection Print Color Gamut
20 extended color gamut digital image
21 adjust color values step
22 limited color gamut digital image
23 compute residual image step
24 residual image
25 analyze residual image step
26 image information parameter(s)
27 image processing operation(s)
28 modified digital image
30 digital file step
31 digital image file
40 digital image file
41 digital file step
42 limited color gamut digital image
43 residual image
44 image information parameter(s)
45 reconstruct extended color gamut digital image
46 reconstructed extended color gamut digital image
47 image processing operation(s)
48 modified digital image
50 image database
51 network server
52 communications network
53 processor
54 monitor
55 input device Parts List (con't)

56 printer
57 card reader
58 user account database
59 network server
60 service provider account database
61 network server
70 input digital image
71 image processing operation(s)
72 modified digital images
73 compute residual image(s) step
74 residual image(s)
75 analyze residual image(s) step
76 image information parameter(s)
77 image processing operation(s)
78 modified digital image

What is claimed is:

1. A method for determining information parameter(s) useful in processing a digital image having color values with an extended color gamut, comprising the steps of:
   a) adjusting the color values of the extended color gamut digital image to fit within a limited color gamut to form a limited color gamut digital image;
   b) determining a residual image representing a difference between the extended color gamut digital image and the limited color gamut digital image such that the limited color gamut digital image and the residual image are adapted to be used to form a reconstructed extended color gamut digital image; and
   c) analyzing the residual image to determine one or more image information parameter(s) related to the information contained in the residual image such parameter(s) being adapted to be used in processing the reconstructed extended color gamut digital image.

2. The method of claim 1 further including the step of:
   d) using the image information parameter(s) in the process of applying one or more image processing operations to the reconstructed extended color gamut digital image or a derived digital image formed from the reconstructed extended color gamut digital image to form a modified digital image.

3. The method of claim 1 wherein determining the image information parameter(s) includes the step of computing statistical metrics from the residual image.

4. The method of claim 1 wherein determining the image information parameter(s) includes comparing pixel values for the residual image to a threshold value to determine the number of pixels exceeding the threshold value.

5. The method of claim 1 wherein determining the image information parameter(s) includes computing the statistical information content of the residual image.

6. The method of claim 1 wherein determining the image information parameter(s) includes determining a measure of the amount, extent or distribution of extended dynamic range information included in the residual image.

7. The method of claim 1 wherein at least one image information parameter(s) relates to the amount, extent or distribution of extended color gamut information included in the residual image.

8. The method of claim 2 where step d) includes using the image information parameter(s) to identify a suggested image processing operation.

9. The method of claim 8 further including the step of interactively presenting the suggested image processing operation to a user.

10. The method of claim 2 where step d) includes using the image information parameter(s) to automatically determine whether an image processing operation is applied to the digital image.

11. The method of claim 2 where step d) includes using the image information parameter(s) to adjust one or more control parameters of an image processing operation.

12. The method of claim 2 where the image information parameter(s) are used in the process of applying an adaptive tonescale operation.

13. The method of claim 2 where the image information parameter(s) are used in the process of applying a color enhancement operation.

14. The method of claim 2 further including the step of printing the modified digital image.

15. The method of claim 2 where the modified digital image is stored on a network server for subsequent access.

16. The method of claim 1 where the limited color gamut digital image is included in a digital image file which is stored using a digital storage medium.

17. The method of claim 16 where the residual image is included as additional data in the digital image file.

18. The method of claim 16 where the image information parameter is included as additional data in the digital image file.

19. The method of claim 1 where the extended color gamut digital image originates from scanning a photographic image.

20. The method of claim 19 where the photographic image is a photographic print, a photographic negative or a photographic transparency.

21. The method of claim 1 where the extended color gamut digital image is provided from a digital camera.

22. The method of claim 1 where the extended color gamut digital image is a computer-generated image.

23. The method of claim 1 further including the step of obtaining payment from a user.

24. The method of claim 23 further including the step of obtaining a payment identifier from the user.

25. The method of claim 24 where the payment identifier includes information about an account from which payment is to be electronically transferred.

26. The method of claim 24 where the payment identifier includes a credit card account where the payment is to be debited.

27. The method of claim 26 further including the step of providing a reader for reading a credit card from the user.

28. The method of claim 24 where the payment identifier is obtained from the user via the communications network.

29. A computer storage product having at least one computer storage medium having instructions stored therein causing one or more computers to perform the method of claim 1.

30. A method for determining information parameter(s) useful in processing an input digital image comprising the steps of:
   a) manipulating an input digital image using at least one image processing operation to form at least one modified digital image in a different image processing state;
   b) designating either the input digital image or one of the modified digital image(s) to be a reference digital image in a reference image processing state; and
   c) determining at least one residual image representing the difference(s) between the reference digital image and another of either the input digital image or the modified digital image(s) such that the reference digital image and the residual image are adapted to be used to form a reconstructed digital image; and
   d) analyzing the residual image to determine one or more image information parameter(s) related to the information contained in the residual image such parameter(s) being adapted to be used in processing the reconstructed digital image.

31. The method of claim 30 further including the step of:
   e) using the image information parameter(s) in the process of applying one or more image processing operations to the reconstructed digital image or a derived digital image formed from the reconstructed digital image to form a modified digital image.

32. A computer storage product having at least one computer storage medium having instructions stored therein causing one or more computers to perform the method of claim 30.

* * * * *